(No Model.)

G. W. BROWN.
LUBRICATOR.

No. 423,662. Patented Mar. 18, 1890.

WITNESSES:
J. DeLoss Underwood
A. F. Macdonald

INVENTOR
G. W. Brown
by Wright Brown Gormley
Attys.

UNITED STATES PATENT OFFICE.

GILMAN W. BROWN, OF WEST NEWBURY, MASSACHUSETTS.

LUBRICATOR.

SPECIFICATION forming part of Letters Patent No. 423,662, dated March 18, 1890.

Application filed June 10, 1889. Serial No. 313,642. (No model.)

*To all whom it may concern:*

Be it known that I, GILMAN W. BROWN, of West Newbury, in the county of Essex and State of Massachusetts, have invented certain new and useful Improvements in Lubricators, of which the following is a specification.

This invention relates to oil cups or lubricators, which are provided with means whereby an increased flow of oil is occasioned by an increase of the temperature of the bearing to which the cup is attached.

The invention has for its object to provide simple and effective devices for increasing the flow of oil from an oil-cup by an increase of temperature of the bearing, and for decreasing or checking the flow by a decrease in the temperature of the bearing; and to this end it consists in the improvements which I will now proceed to describe and claim.

Figure 1:
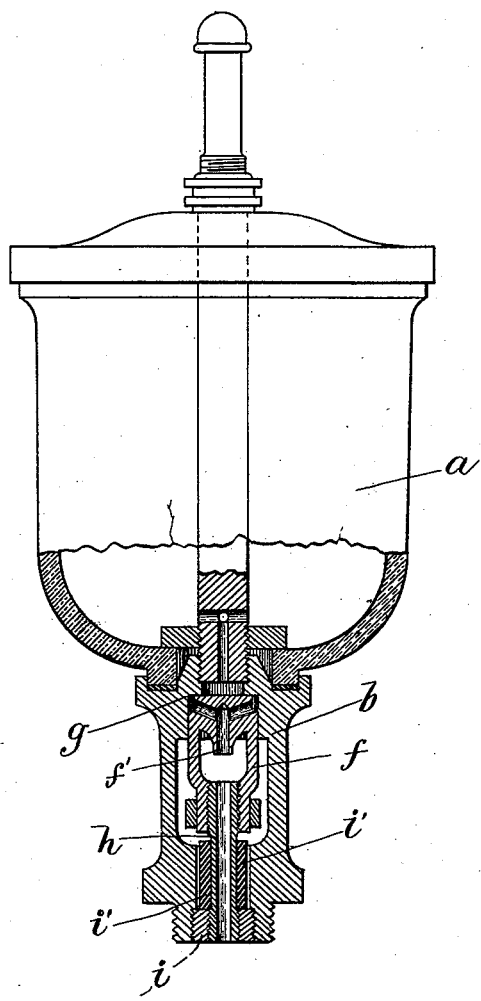
Figure 2:
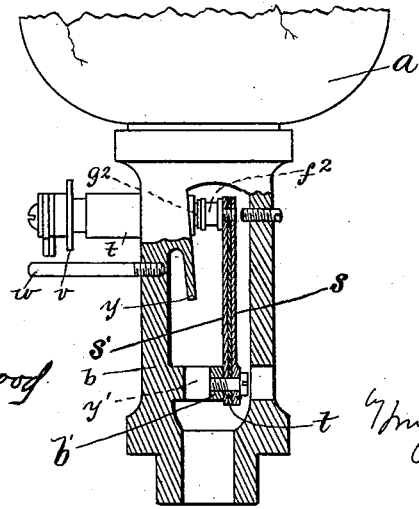

Of the accompanying drawings, forming a part of this specification, Figure 1 represents a vertical section of an oil cup or lubricator embodying my invention. Fig. 2 represents a modification.

The same letters of reference indicate the same parts in both figures.

In the drawings, $a$ represents an oil cup or reservoir, and $b$ represents a metallic shank, which supports the cup and has an oil passage or conduit extending through it and communicating with the oil-reservoir. The body of the cup is preferably of glass, suitably secured to the shank, although both may be made of metal in one piece, if preferred. The shank is externally screw-threaded at its lower end, or otherwise fitted for attachment to a shaft-bearing.

Referring to Fig. 1, $f$ represents a valve, which is arranged to control the passage of oil through the conduit of the shank to the bearing by moving toward or from a seat $g$, formed in the oil-conduit in the shank, or in any other suitable way. The valve is supported by a metallic standard or valve support $h$, which is secured at one end to the valve and at its other end to the shank $b$ by means of a bushing or insulator $i$ of any suitable material which is a poor conductor of heat, such as vulcanized fiber or boxwood. Said insulator prevents, to a great extent, the conduction of heat from the shank $b$ to the standard or valve support $h$, so that if the bearing becomes heated the shank $b$, which is in direct contact with the bearing, is heated thereby and is expanded, while the standard or valve support protected by the insulator $i$ does not expand. The result is the separation of the seat $g$ from the valve and an increased flow of oil. To additionally protect the standard or valve support from heat radiated from the shank $b$, a sleeve or casing $i'$ of non-conducting material may be placed thereon within the shank $b$ and above the insulator $i$. It will be seen that the standard or valve support $h$ thus protected may be made of the same metal as the cup-supporting shank, no unequal expansion of two metals having different coefficients of expansion being required.

The standard or valve support $h$ (shown in Fig. 1) is tubular, and serves as a part of the oil-conduit through the shank $b$, and the valve is shown as provided with a central depression $f'$, in which an orifice through the valve terminates, the arrangement being such that oil dropping from the valve falls into the tubular standard or valve support $h$, and is visible through an open cage or frame connecting the valve with said standard or valve support and through sight-openings formed in the shank $b$. The oil flowing through said tubular standard or valve support has a tendency to prevent the heating of the same, and therefore co-operates with the insulator in producing the described result.

I do not limit my present improvement, however, to use in connection with a valve of the general construction here shown and described, it being obvious that the construction and arrangement of the essential parts may be variously modified without departing from the spirit of my invention. A modification is shown in Fig. 2, in which the valve is supported by a standard or valve support composed of two metal strips $s$ $s'$, separated by an interposed insulator $t$. The valve, which in this figure is lettered $f^2$, is attached to the strip $s'$, and the strip $s'$ bears against a projection $b'$ on the shank $b$, to which the strips are attached. The strip $s'$ is therefore heated by the shank when the latter is heated, and is therefore expanded, while the strip $s$, protected by the insulator, does not expand. The result is a bending of the standard or valve support, whereby the valve is moved away from its seat. The seat $g^2$ for the valve is at the end of a tube $t$, which is inserted in a threaded orifice in the shank $b$, and has an externally-threaded portion in said socket, so that by turning the tube the seat $g^2$ may be adjusted toward or from the valve. The tube is provided with an arm $v$, whereby it may be turned. $w$ represents a stop-pin attached to the shank $b$ and arranged to serve as a stop for the arm $v$, and thus limit the turning of the tube $t$. $y$ represents a projection on the shank $b$ below the seat $g^2$. The oil escaping through the seat $g^2$ trickles down said projection and falls from the lower end thereof through an opening $y'$ below it in the projection $b'$.

I claim—

1. The combination of a cup-supporting shank having an oil-conduit, a valve to control the passage of oil through said conduit, and an insulator composed of a non-conductor of heat, whereby variations of temperature affecting said shank are prevented from affecting the valve, as set forth.

2. The combination of a cup-supporting shank having an oil-conduit and a valve-seat therein, a valve arranged to co-operate with said seat and a non-conducting holder or bushing separating said valve from the shank or standard, substantially as and for the purpose specified.

3. The combination of a cup-supporting shank having an oil-conduit and a valve-seat therein, a valve arranged to co-operate with said seat, a stem or support for said valve, and an insulator interposed between the stem or support and the shank or standard, as set forth.

4. The combination of an oil cup or reservoir, a metallic shank secured to the bottom thereof, a valve within the shank adapted to control the discharge of oil from the reservoir, a tubular support for the valve composed of metal, and a bushing of non-conducting material interposed between said tubular support and the shank, whereby said support is connected with the shank and the conduction of heat from the shank to the support is prevented, said support being arranged to serve also as a conduit for the oil that passes the valve, as set forth.

In testimony whereof I have signed my name to this specification, in the presence of two subscribing witnesses, this 22d day of January, A. D. 1889.

GILMAN W. BROWN.

Witnesses:
C. F. BROWN,
A. D. HARRISON.